Feb. 12, 1952     G. J. MORGENTHALER     2,585,158
AUTOMOBILE BODY REPAIR TOOL
Filed Jan. 30, 1950     2 SHEETS—SHEET 1
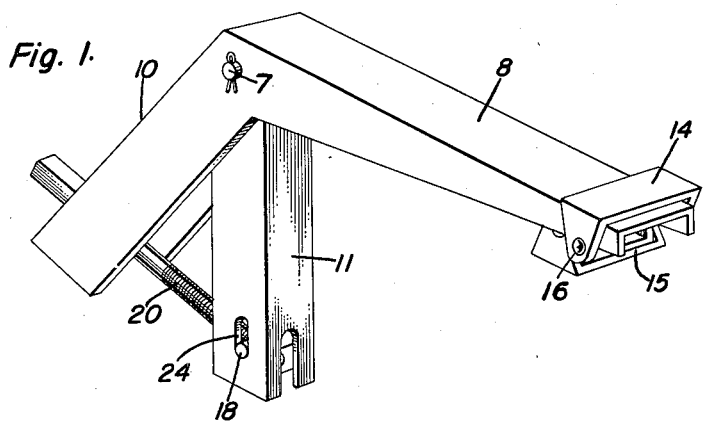
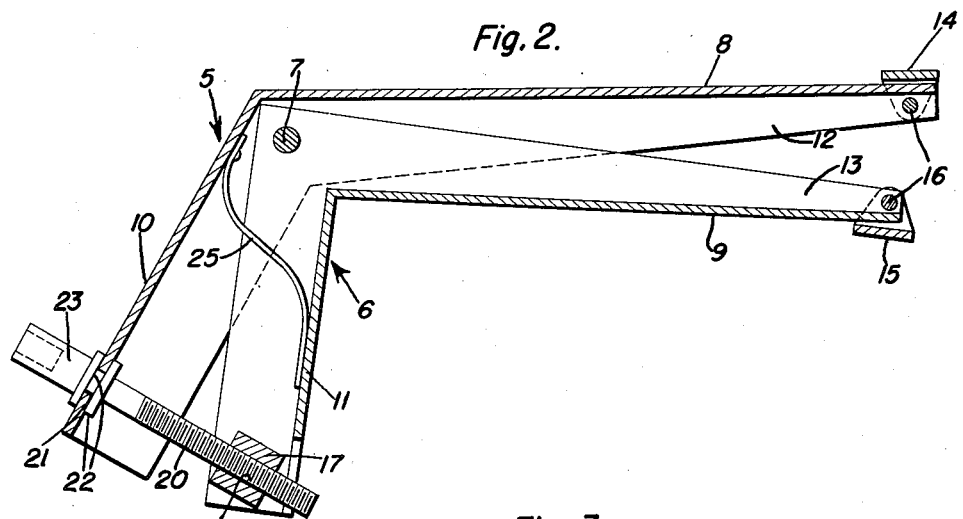
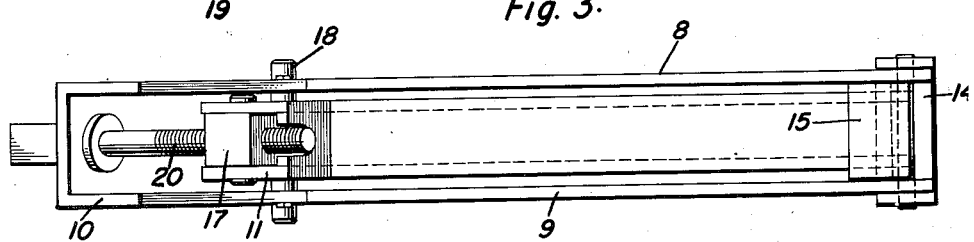
Gottlieb Jacob Morgenthaler
INVENTOR.

Feb. 12, 1952  G. J. MORGENTHALER  2,585,158
AUTOMOBILE BODY REPAIR TOOL

Filed Jan. 30, 1950  2 SHEETS—SHEET 2

Gottlieb Jacob Morgenthaler
INVENTOR.

UNITED STATES PATENT OFFICE 2,585,158

AUTOMOBILE BODY REPAIR TOOL

Gottlieb Jacob Morgenthaler, Philadelphia, Pa.

Application January 30, 1950, Serial No. 141,196

2 Claims. (Cl. 81—15)

The present invention relates to new and useful improvements in automobile body repair tools for use in straightening or removing dents and other irregularities from hollow door and other panels of an automobile body which are normally inaccessible or difficult for using an ordinary repair tool.

An important object of the present invention is to provide a repair tool or jack of this character constructed with a pair of pivoted jaws with pressure plates mounted on the outer sides of the jaws to subject the panel of the automobile to internal pressure by an opening movement of the jaws.

Another object of the invention is to provide a channel-shaped jaw with one jaw working in the channel of the other jaw to enable insertion of the jaws in small spaces.

A further object of the invention is to form the inner or handle ends of the jaws with angular levers with screw operating means therefor to subject the outer ends of the jaws to a desired spreading pressure.

A further object of the invention is to provide self-adjusting pressure plates at the outer ends of the jaws to prevent slipping of the jaws on the work.

A still further object is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a longitudinal sectional view;

Figure 3 is a bottom plan view;

Figure 4:
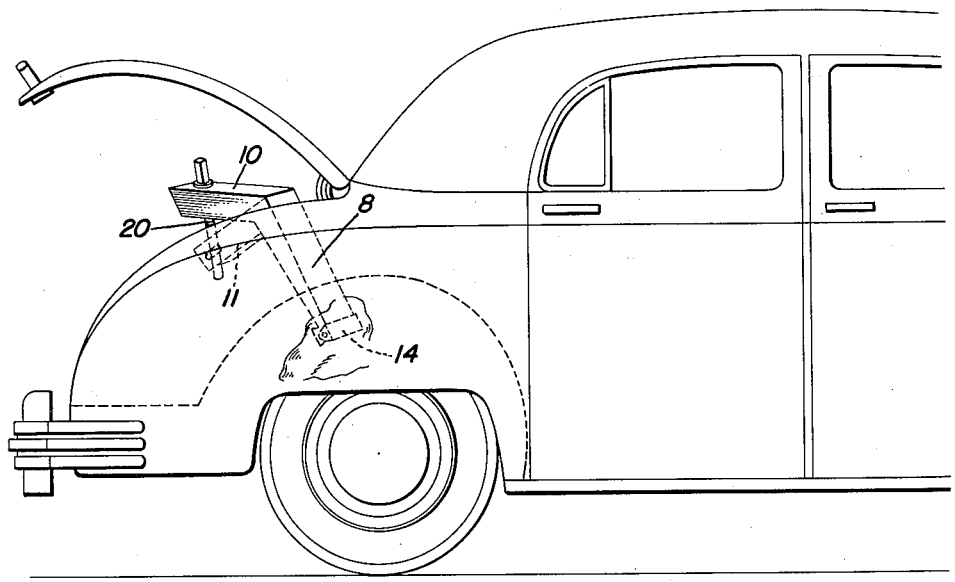
Figure 4 is a side elevational view showing the tool positioned for removing a dent from a rear wheel fender.
Figure 5:
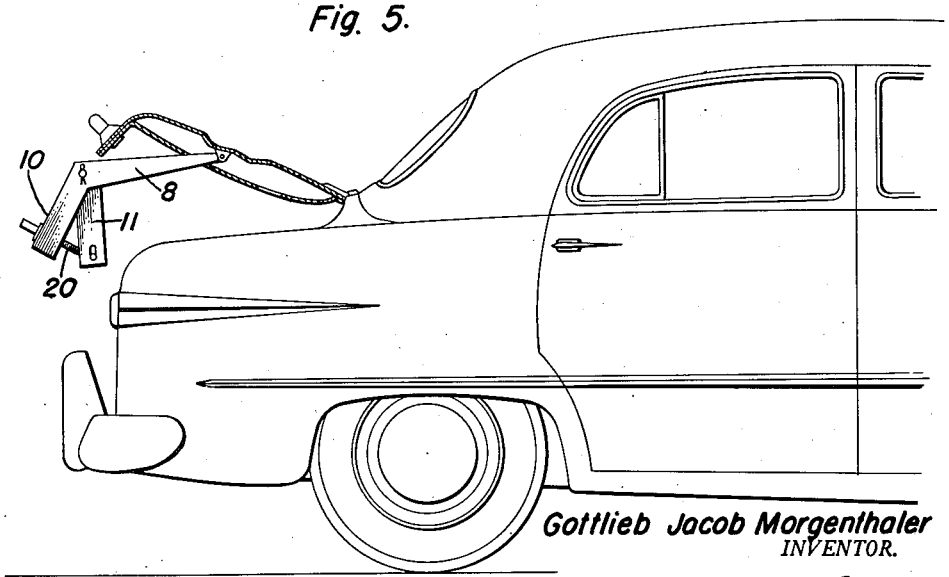
Figure 5 is a similar view showing the tool in position for use with a trunk door.

Referring now to the drawings in detail, wherein for the purpose of illustration I have disclosed a preferred embodiment of the invention, the numerals 5 and 6 designate a pair of substantially bellcranks or angle members of channel construction having their open or channel portions opposed to each other and with the channel member 6 positioned within the channel member 5 and pivotally connected thereto at the junction of their angular portions by a transverse pin 7 passing through the flanges of the channel members.

The ends 8 and 9 of the channel members 5 and 6 provide jaws which are substantially longer than the ends 10 and 11 which constitute handles or levers. The flanges 12 and 13 of jaws 8 and 9 taper toward their outer ends to reduce the thickness of the jaws and substantially U-shaped pressure plates 14 and 15 are pivoted to the outer ends of jaws 8 and 9 by means of transverse pins 16 passing through the flanges 12 and 13, the pressure plates being self-adjusting on the pins and are positioned outwardly of their respective jaws.

A block 17 is formed with trunnions 18 at its opposite ends for pivotally mounting to the flanges of handle or lever 11 of channel member 6, the block having a threaded bore 19 for a screw 20.

The rear end of feed screw 20 is rotatably held in an opening 21 of the handle or lever end 10 of channel member 5 by means of a pair of flanges 22 positioned respectively inwardly and outwardly of the channel member and the outer end of the feed screw 20 is formed with a wrench receiving socket 23.

The trunnions 18 of block 17 work in slot 24 in the flanges of handle or lever 11 to prevent binding of the trunnions therein during opening and closing movement of the handle.

A leaf spring 25 is secured at one end in handle or lever 10 of channel member 5 and with its free end bearing against the handle or lever 11 of channel member 6 to exert a closing pressure on jaws 8 and 9.

In the operation of the tool the jaws 8 and 9, with pressure plates 14 and 15 thereon are inserted in the hollow trunk lid panel, rear wheel housing panel, or other automobile body panels and feed screw 20 is turned in a direction to move handles or levers 10 and 11 toward each other which thus opens jaws 8 and 9 and thus subjects the panel to internal pressure to remove dents or other irregularities therefrom by pressing outwardly on the dent or irregularity in the panel.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An automobile body repair tool comprising a pair of bellcrank channel members each having a pair of legs joined together and said pairs of legs being pivoted to each other at the junction portions of said legs, said channel members having their open sides opposed to each other and positioned one within the other, jaws at one end of the channel members, pressure plates pivoted at the outer ends of the jaws and positioned at the outer surfaces thereof, handles at the other ends of the channel members, a screw journaled in one handle, and feed means carried by the other handle and mounted on the screw for traveling movement to open and close the jaws by the turning of the screw.

2. An automobile body repair tool comprising a pair of bellcrank channel members pivoted to each other at their central portions and with their open sides opposed to each other and positioned one within the other, jaws at one end of the channel members, pressure plates pivotally mounted at the outer ends of the jaws and positioned at the outer surfaces thereof, handles at the other ends of the channel members, the sides of one of the handles having slots therein, a block having trunnions slidably disposed and pivoted in the slots, said block having a threaded bore, and a captive screw journaled in the other handle and working in the bore to move the handles toward and away from each other for opening and closing the jaws.

GOTTLIEB JACOB MORGENTHALER.

REFERENCES CITED

The following references are of record in the file of this patent:

UNITED STATES PATENTS

| Number | Name | Date |
| --- | --- | --- |
| 326,909 | Kricker | Sept. 22, 1885 |
| 442,733 | Shampel | Dec. 16, 1890 |
| 1,448,238 | Schmitz | Mar. 13, 1923 |
| 1,802,232 | Bridwell et al. | Apr. 21, 1931 |
| 2,447,401 | Ferguson et al. | Aug. 17, 1948 |